(12) United States Patent
Haedicke et al.

(10) Patent No.: US 11,137,027 B2
(45) Date of Patent: Oct. 5, 2021

(54) MULTI-LAYER SLIDING-BEARING ELEMENT

(71) Applicant: Miba Gleitlager Austria GmbH, Laakirchen (DE)

(72) Inventors: Lukas Haedicke, Altmuenster (AT); Sigmar Dominic Josef Janisch, Laakirchen (AT); Alexander Poscher, Linz (AT)

(73) Assignee: MIBA GLEITLAGER AUSTRIA GMBH, Laakirchen (AT)

( * ) Notice: Subject to any disclaimer, the term of this patent is extended or adjusted under 35 U.S.C. 154(b) by 172 days.

(21) Appl. No.: 16/477,256

(22) PCT Filed: Feb. 5, 2018

(86) PCT No.: PCT/AT2018/060031
§ 371 (c)(1),
(2) Date: Jul. 11, 2019

(87) PCT Pub. No.: WO2018/140997
PCT Pub. Date: Aug. 9, 2018

(65) Prior Publication Data
US 2019/0368545 A1    Dec. 5, 2019

(30) Foreign Application Priority Data
Feb. 6, 2017 (AT) .............................. A 50091/2017

(51) Int. Cl.
*F16C 33/12* (2006.01)
*C22C 21/00* (2006.01)
*C22C 38/00* (2006.01)

(52) U.S. Cl.
CPC ............ *F16C 33/122* (2013.01); *C22C 21/00* (2013.01); *C22C 38/00* (2013.01); *F16C 33/121* (2013.01);
(Continued)

(58) Field of Classification Search
None
See application file for complete search history.

(56) References Cited

U.S. PATENT DOCUMENTS

| 5,384,205 A | 1/1995 | Tanaka et al. |
| 6,413,654 B1 | 7/2002 | Kagohara et al. |

(Continued)

FOREIGN PATENT DOCUMENTS

| CN | 102900767 A | 1/2013 |
| DE | 43 32 433 A1 | 5/1994 |

(Continued)

OTHER PUBLICATIONS

International Search Report in PCT/AT2018/060031, dated Jun. 29, 2018.

*Primary Examiner* — Daniel J. Schleis
(74) *Attorney, Agent, or Firm* — Collard & Roe, P.C.

(57) ABSTRACT

The invention relates to a multi-layer sliding bearing element (1) comprising a support layer (2) and a layer (3) arranged thereon, said layer (3) consisting of an aluminum base alloy with aluminum as the main component, wherein the aluminum base alloy contains between 0 wt. % and 7 wt. % tin, between 1.1 wt. % and 1.9 wt. % copper, between 0.4 wt. % and 1 wt. % manganese, between 0.05 wt. % and 0.18 wt. % cobalt, between 0.05 wt. % and 0.18 wt. % chromium, between 0.03 wt. % and 0.1 wt. % titanium, between 0.05 wt. % and 0.18 wt. % zirconium and between 0 wt. % and 0.4 wt. % silicon and the balance adding up to 100 wt. % being constituted by aluminum and impurities potentially originating from the production of the elements, with the proviso that, in any case, tin or silicon are contained in the aluminum base alloy.

7 Claims, 1 Drawing Sheet

Figure 1:
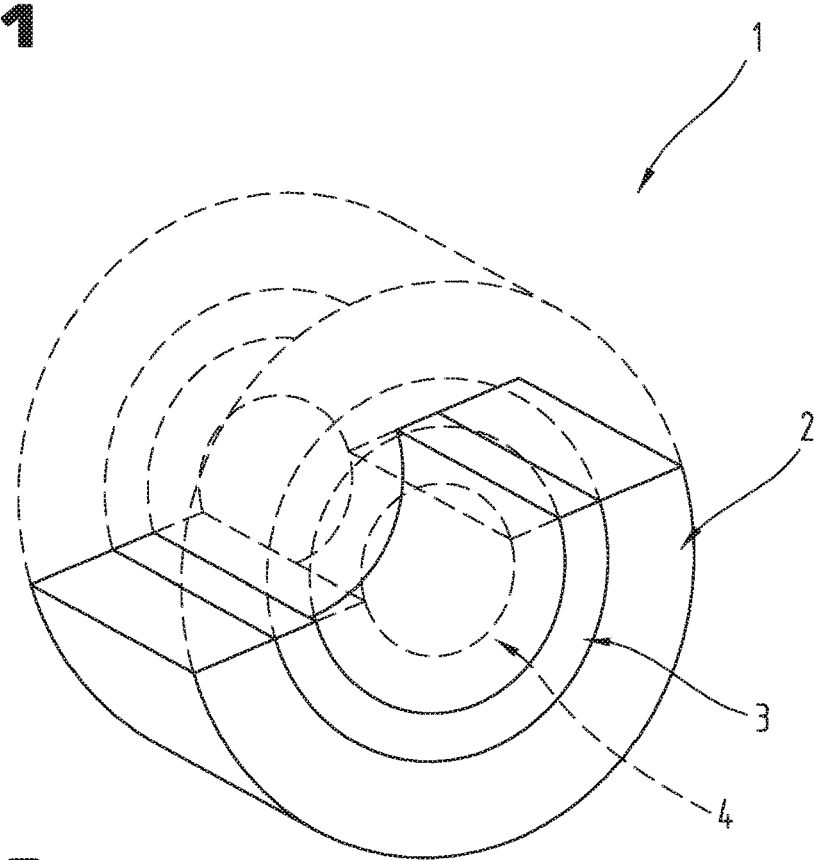

(52) U.S. Cl.
CPC ... *F16C 2204/22* (2013.01); *Y10T 428/12757* (2015.01)

(56)  References Cited

U.S. PATENT DOCUMENTS

| | | |
|---|---|---|
| 6,506,503 B1 | 1/2003 | Mergen et al. |
| 6,596,412 B2 | 7/2003 | Mergen |
| 7,041,387 B2 | 5/2006 | Kagohara et al. |
| 10,494,701 B2 * | 12/2019 | Buerkle ................ B32B 15/012 |
| 2004/0028939 A1 | 2/2004 | Kagohara et al. |
| 2005/0221110 A1 | 10/2005 | Fujita et al. |
| 2012/0128285 A1 | 5/2012 | Kagohara et al. |
| 2016/0091021 A1 | 3/2016 | Yamamoto |
| 2018/0209017 A1 | 7/2018 | Buerkle et al. |

FOREIGN PATENT DOCUMENTS

| | | |
|---|---|---|
| DE | 101 49 675 A1 | 5/2002 |
| DE | 103 35 086 A1 | 3/2004 |
| DE | 11 2010 003 120 T5 | 1/2013 |
| EP | 2 985 358 A1 | 2/2016 |
| WO | 97/22725 A1 | 6/1997 |
| WO | 00/06788 A1 | 2/2000 |

* cited by examiner

MULTI-LAYER SLIDING-BEARING ELEMENT

CROSS REFERENCE TO RELATED APPLICATIONS

This application is the National Stage of PCT/AT2018/060031 filed on Feb. 5, 2018, which claims priority under 35 U.S.C. §119 of Austrian Application No. A 50091/2017 filed on Feb. 6, 2017, the disclosure of which is incorporated by reference. The international application under PCT article 21(2) was not published in English.

The invention relates to a multi-layer sliding bearing element comprising a support layer and a layer arranged thereon, said layer consisting of an aluminum base alloy with aluminum as the main component.

The use of aluminum base alloys in sliding bearing technology has been known for a long time and was variously described in relevant literature. For example, WO 97/22725 A1 describes an aluminum alloy, for a layer of a sliding bearing, to which tin as the main alloying component and a hard material of at least one element of a first group of elements including iron, manganese, nickel, chromium, cobalt, copper and/or platinum, magnesium, antimony are added, wherein a quantity of elements from the first group of elements for forming intermetallic phases, e.g. aluminides, in the boundary regions of the matrix is added to the aluminum alloy and in addition at least one further element from a second group of elements containing manganese, antimony, chromium, tungsten, niobium, vanadium, cobalt, silver, molybdenum or zirconium to replace a part of at least one hard material of the first group of elements to form approximately spherical or cubic aluminides is added.

From DE 43 32 433 A1, a multi-layer sliding bearing element is known, which comprises an Al—Sn bearing alloy layer, which has a high fatigue resistance and a good compatibility with an associated sliding contact member, a backing steel plate and an intermediate bonding layer from a further aluminum alloy, wherein the Al—Sn bearing alloy, referring to the weight, essentially consisting of 7 to 20% Sn and the balance being Al and impurities from the smelting process and has a hardness of 50 to 80 VHN, wherein the intermediate bonding layer from the aluminum alloy essentially consists of at least one of the following components, the quantities of which refer to the weight: up to 1.7% Mn, up to 1.2% Cu and up to 1.8% Mg and the balance being Al and impurities from the smelting process, and wherein the hardness ratio of the intermediate bonding layer from aluminum alloy to the AL—Sn bearing alloy, indicated as Vickers Hardness Number (VHN), exceeds 70% and amounts to no more than 90%. The Al—Sn alloy can contain at least one of the following components, the quantities of which refer to the weight: 0.01 to 3% Mn, Mg, V, Ni, Cr, Zr and/or B, 0.2 to 5% Cu, 0.1 to 3% Pb, 0.1 to 3% Sb and 0.01 to 1% Ti. It may further be provided for that the aluminum alloy of the intermediate bonding layer in total contains up to 3 wt. % of at least one of the elements Si, Cr, Ti and Fe.

As is known from the last-mentioned DE 43 32 433 A1, for improving the adherence of the bearing alloy layer on the backing steel plate, an intermediate bonding layer also consisting of an aluminum alloy can be used. Other aluminum alloys, such as Al3Sc (WO 00/06788 A1), were also used for the intermediate bonding layer. Besides, designs in which the bearing alloy layer is connected to the steel support layer via a bonding film of pure aluminum are known from the prior art.

The object underlying the present invention is to create a multi-layer sliding bearing element with an aluminum base alloy, in which the aluminum base alloy comprises a good bonding on the support layer and which exhibits a low notch effect.

The object of the invention is achieved by means of the initially mentioned multi-layer sliding bearing element, in which the aluminum base alloy contains between 0 wt. % and 7 wt. % tin, between 1.1 wt. % and 1.9 wt. % copper, between 0.4 wt. % and 1 wt. % manganese, between 0.05 wt. % and 0.18 wt. % cobalt, between 0.05 wt. % and 0.18 wt. % chromium, between 0.03 wt. % and 0.1 wt. % titanium, between 0.05 wt. % and 0.18 wt. % zirconium and between 0 wt. % and 0.4 wt. % silicon and the balance adding up to 100 wt. % being constituted by aluminum and impurities potentially originating from the production of the elements, with the proviso that, in any case, tin or silicon are contained in the aluminum base alloy.

In this regard, it is of advantage that due to the low share of alloying elements other than aluminum and tin in the alloy, the risk of brittle fractures on the boundary surface between the support element and the layer of aluminum base alloy in consequence of formed brittle phases can be reduced. The aluminum base alloy hence, considered over time, has a lower tendency towards brittle fractures (towards spalling) and thus a better bonding on the support layer. This effect can be further increased if silicon, which improves the avoidance of the formation of brittle phases as a retarder, is contained in the aluminum base alloy. In this regard, however, the relative share of silicon in the aluminum base alloy is not as high that it is tribologically active, whereby the notch effect can be prevented. Thus, with the aluminum base alloy, the tribological properties of known silicon-free aluminum base alloys can at least approximately be achieved, while the bond fatigue strength of the multi-layer sliding bearing element can be improved.

According to an embodiment variant of the multi-layer sliding bearing element, it can be provided for that the support layer consists of an iron-based alloy and that the aluminum base alloy is connected directly to the iron-based support layer and consists of between 5 wt. % and 7 wt. % tin, between 1.1 wt. % and 1.5 wt. % copper, between 0.4 wt. % and 0.8 wt. % manganese, between 0.05 wt. % and 0.15 wt. % cobalt, between 0.05 wt. % and 0.15 wt. % chromium, between 0.03 wt. % and 0.10 wt. % titanium, between 0.05 wt. % and 0.15 wt. % zirconium and between 0.2 wt. % and 0.4 wt. % silicon and the balance adding up to 100 wt. % being constituted by aluminum and impurities potentially originating from the production of the elements. Hence, the aforementioned effects can be realized with just a single layer of the aluminum base alloy.

In this regard, it is further possible that for the silicon within the layer of the aluminum base alloy, a concentration gradient with an increasing share of silicon in the direction onto the support layer is formed. It can hence be achieved that the effect of the addition of silicon on the bonding zone between the support layer and the layer of the aluminum base alloy is at least in large part concentrated and that the avoidance of the tribological activeness of the silicon in the aluminum base alloy can be realized more easily, as hence, areas resting directly on a sliding partner can be formed to be silicon-free.

According to another embodiment variant, it can be provided for achieving the aforementioned effects that the support layer consists of an iron-based alloy and that the aluminum base alloy is connected directly to the iron-based support layer and consists of between 1.5 wt. % and 1.9 wt. % copper, between 0.6 wt. % and 1.0 wt. % manganese, between 0.08 wt. % and 0.18 wt. % cobalt, between 0.08 wt. % and 0.18 wt. % chromium, between 0.03 wt. % and 0.10 wt. % titanium, between 0.08 wt. % and 0.18 wt. % zirconium and between 0.2 wt. % and 0.4 wt. % silicon and the balance adding up to 100 wt. % being constituted by aluminum and impurities potentially originating from the production of the elements and that a further layer of a further aluminum base alloy is connected to the layer of the aluminum base alloy, wherein the further layer consists of the further aluminum base alloy which is silicon-free. In this regard, it is further advantageous that the further layer of the further aluminum base alloy can be better adapted to the tribological requirements of a running layer. Moreover, hence, the layer of the aluminum alloy arranged between the support layer and the further layer of the further aluminum alloy has emergency running properties, which counteract a sudden failure of the multi-layer sliding bearing element in consequence of at least partial wear of the further layer arranged on top thereof.

Preferably, according to a further embodiment variant, it is provided for in this regard that the further aluminum base alloy of the further layer consists of between 5.0 wt. % and 7.0 wt. % tin, between 1.1 wt. % and 1.5 wt. % copper, between 0.4 wt. % and 0.8 wt. % manganese, between 0.05 wt. % and 0.15 wt. % cobalt, between 0.05 wt. % and 0.15 wt. % chromium, between 0.03 wt. % and 0.1 wt. % titanium, between 0.05 wt. % and 0.15 wt. % zirconium and the balance adding up to 100 wt. % being constituted by aluminum and impurities potentially originating from the production of the elements. Hence, the compatibility of materials between the two aluminum base alloys can be improved.

In this embodiment variant, the aluminum base alloy of the layer directly connected to the iron-based support layer and the further aluminum base alloy of the further layer with respect to the elements copper, manganese, cobalt, chromium, titanium and zirconium preferably comprise the same relative quantitative proportions in terms of the respective share of aluminum. Hence, a better compatibility of materials of the two aluminum base alloys can be achieved.

According to a further embodiment variant of the multi-layer sliding bearing element, it can be provided for that the ratio of the quantitative proportions of titanium and cobalt amounts to between 1:3 and 3:1. The aluminum base alloy hence has a fine-grained structure, which only has a low tendency towards recrystallization also under the conditions during the use of the multi-layer sliding bearing element.

In the aluminum alloy of the layer directly connected to the iron-based support layer and in the further aluminum alloy of the further layer respectively, intermetallic precipitates are present. In this regard, it can be provided for that a medium size of the intermetallic precipitates in the aluminum alloy of the layer directly connected to the iron-based support layer is smaller than a medium size of the intermetallic precipitates in the further aluminum alloy of the further layer. It can thus be achieved that the aluminum base alloy of the layer connected to the iron-based support layer is tougher. This, in turn, has a positive effect on the capacity to withstand alternating stresses of the multi-layer sliding bearing element, as this aluminum base alloy hence does not have an effect initiating cracks. Thus, the notch effect of the intermetallic phases can also be reduced.

It is further possible that titanium up to a maximum of half the titanium share to the aluminum base alloy is replaced by zirconium and/or scandium and/or that at least one element of the group of manganese, cobalt and chromium to the respective extent of a maximum of half the quantitative proportion of these elements to the aluminum base alloy respectively is replaced by vanadium and/or molybdenum and/or iron. With these embodiment variants, the particle size distribution and/or the recrystallization behavior of the aluminum base alloy can be influenced.

For the purpose of better understanding of the invention, it will be elucidated in more detail by means of the figures below.

Figure 2:
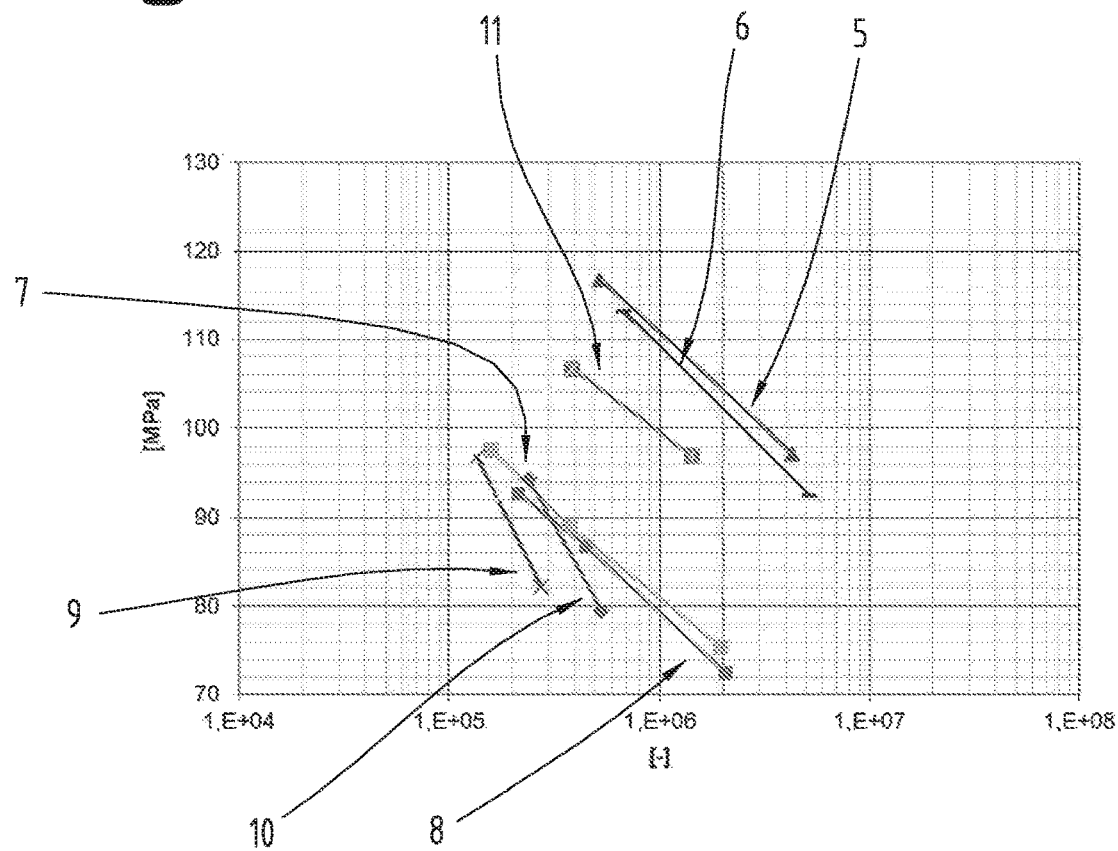

These show (in a simplified schematic representation):

FIG. 1 a side view of a multi-layer sliding bearing element;

FIG. 2 the alternate bending strengths of different aluminum base alloys.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, are to be analogously transferred to the new position.

All indications regarding the quantitative composition of the aluminum base alloy(s) are to be understood in wt. % if not explicitly indicated otherwise.

FIG. 1 shows a multi-layer sliding bearing element 1 in an oblique view. The multi-layer sliding bearing element 1 comprises and/or consists of a support layer 2 and a layer 3 arranged thereon and connected thereto.

The unclosed multi-layer sliding bearing element 1, besides the represented half shell design with an angle range coverage of at least approximately 180°, can also have a deviating angle range coverage, for example at least approximately 120° or at least approximately 90°, such that the multi-layer sliding bearing element 1 can thus also be designed as a third of a shell or a quarter of a shell, which are combined in a bearing receptacle with corresponding further bearing shells, wherein the multi-layer sliding bearing element 1 according to the invention is preferably incorporated in the higher loaded area of the bearing receptacle.

However, other embodiment variants of the multi-layer sliding bearing element 1 are also possible, for example a design as a bearing bush, as is adumbrated in dashed lines in FIG. 1, or a planar design, for example as a guard plate.

The support layer 2 usually consists of a hard material. As materials for the support layer 2, also referred to as support shell, bronzes, brass, etc. can be used. In the preferred embodiment variant of the invention, the support layer 2 consists of an iron-based material, in particular of a steel.

Thus constructed installations of multi-layer sliding bearing element 1 are in general known from the prior art, such that in this regard, reference be made to the relevant prior art.

The layer 3 consists of aluminum base alloy. The aluminum base alloy consists of:

0 wt. % to 7 wt. % tin
1.1 wt. % to 1.9 wt. % copper
0.4 wt. % to 1 wt. % manganese
0.05 wt. % to 0.18 wt. % cobalt
0.05 wt. % to 0.18 wt. % chromium
0.03 wt. % to 0.1 wt. % titanium
0.05 wt. % to 0.18 wt. % zirconium and
0 wt. % to 0.4 wt. % silicon.

The balance adding up to 100 wt. % is constituted by the aluminum as the main component of the aluminum base alloy as well as by impurities potentially originating from the production of the elements.

The aluminum base alloy in any case contains tin and silicon.

The general effects of the individual alloying elements are sufficiently represented in the prior art and known to the person skilled in the art, such that the repetition of these can be dispensed with.

The respective shares of the individual alloying elements to the aluminum base alloy were selected for the following reasons, the effect of the added elements respectively not being sufficient below the respectively indicated minimum level of the share ranges:

7 wt. % tin: Above 7 wt. % tin, the risk of heat crack sensitivity of the aluminum base alloy increases.

1.9 wt. % copper: Above 1.9 wt. % copper, the formability of the aluminum base alloy is reduced.

0.1 wt. % titanium: Above 0.1 wt. % titanium, corrosion problems, which can reduce the creep resistance of the aluminum base alloy, can occur. Moreover, it was observed that as compared to known sputter bearings, the squeezing out of the tin can be avoided.

1 wt. % manganese; 0.18 wt. % cobalt; 0.18 wt. % chromium; 0.18 wt. % zirconium; 0.4 wt. % silicon: In case of a share of the respecting elements exceeding the indicated maximum levels, the quantities of the precipitate increase without an additional gain in strength. Moreover, the notch effect of the precipitates increases.

Titanium can up to half of the aforementioned titanium share to the aluminum base alloy be replaced by zirconium and/or scandium.

It is further possible that at least one element of the group of manganese, cobalt and chromium to the respective extent of a maximum of half the aforementioned quantitative proportion of these elements to the aluminum base alloy is replaced by vanadium and/or molybdenum and/or iron.

According to a preferred embodiment variant, the multi-layer sliding bearing element 1 consists of the support layer 2 of an iron-based alloy, in particular a steel, and the layer 3 of the aluminum base alloy that is arranged immediately thereon and connected to the support layer 2. In this case, the latter preferably consists of 5 wt. % to 7 wt. % tin, 1.1 wt. % to 1.5 wt. % copper, 0.4 wt. % to 0.8 wt. % manganese, 0.05 wt. % to 0.15 wt. % cobalt, 0.05 wt. % to 0.15 wt. % chromium, 0.03 wt. % to 0.10 wt. % titanium, 0.05 wt. % to 0.15 wt. % zirconium, 0.2 wt. % to 0.4 wt. % silicon. The balance adding up to 100 wt. % is constituted by the aluminum as well as by impurities potentially originating from the production of the elements.

In particular, the aluminum base alloy of this embodiment variant can consist of 6 wt. % tin, 1.3 wt. % copper, 0.6 wt. % manganese, 0.10 wt. % cobalt, 0.10 wt. % chromium, 0.07 wt. % titanium, 0.10 wt. % zirconium, 0.3 wt. % silicon and the balance adding up to 100 wt. % being constituted by aluminum and impurities potentially originating from the production of the elements.

According to a further embodiment variant of the multi-layer sliding bearing element 1, it can be provided for that for the silicon within the layer 3 of the aluminum base alloy, a concentration gradient with an increasing share of silicon in the direction onto the support layer 2 is formed. For example, the concentration of the silicon in the layer 3 can increase from 0 wt. % on the outer surface, i.e. the one facing away from the support layer 2, of the layer 3, to a value of 0.3 wt. % on the surface resting on the support layer 2. In this regard, the increase in the silicon concentration can take place linearly or exponentially or by leaps and bounds.

According to another embodiment variant of the multi-layer sliding bearing element 1, it can be provided for that the support layer 2 consists of an iron-based alloy and that the layer 3 forming the aluminum base alloy is directly connected to the iron-based support layer 2. On this layer 3, a further layer 4 is arranged, as is represented in dashed lines in FIG. 1, such that thus, the layer 3 is arranged between the support layer 2 and the further layer 4. The further layer 4 is arranged directly on the layer 3 and connected thereto. Other than in the aforementinned embodiment variant, the layer 3, that is directly connected to the support layer 2, thus does not form the running layer of the multi-layer sliding bearing element 1, but a layer by means of which the further layer 4 of the further aluminum base alloy forming the running layer is connected to the support layer 2.

The aluminum base alloy of the layer 3, which is directly connected to the support layer 2, in this case consists of between 1.5 wt. % and 1.9 wt. % copper, between 0.6 wt. % and 1.0 wt. % manganese, between 0.08 wt. % and 0.18 wt. % cobalt, between 0.08 wt. % and 0.18 wt. % chromium, between 0.03 wt. % and 0.10 wt. % titanium, between 0.08 wt. % and 0.18 wt. % zirconium, between 0.2 wt. % and 0.4 wt. % silicon and the balance adding up to 100 wt. % being constituted by aluminum and impurities potentially originating from the production of the elements. In particular, this aluminum base alloy of the layer 3 can consist of 1.7 wt. % copper, 0.8 wt. % manganese, 0.13 wt. % cobalt, 0.13 wt. % chromium, 0.07 wt. % titanium, 0.13 wt. % zirconium, 0.3 wt. % silicon and the balance adding up to 100 wt. % being constituted by aluminum and impurities potentially originating from the production of the elements.

The further aluminum base alloy of the further layer 4 is silicon-free with the exception of allowed impurities of the metals from the aluminum base alloy is produced. Apart from that it can consist of an aluminum base alloy as is known from the prior art for running layers of sliding bearings.

However, preferably, the further layer 4 consists of a further aluminum base alloy consisting of between 5.0 wt. % and 7.0 wt. % tin, between 1.1 wt. % and 1.5 wt. % copper, between 0.4 wt. % and 0.8 wt. % manganese, between 0.05 wt. % and 0.15 wt. % cobalt, between 0.05 wt. % and 0.15 wt. % chromium, between 0.03 wt. % and 0.1 wt. % titanium, between 0.05 wt. % and 0.15 wt. % zirconium and the balance adding up to 100 wt. % being constituted by aluminum and impurities potentially originating from the production of the elements. In particular, the further layer 4 consists of an aluminum base alloy consisting of 6.0 wt. % tin, 1.3 wt. % copper, 0.6 wt. % manganese, 0.10 wt. % cobalt, 0.10 wt. % chromium, 0.07 wt. % titanium, 0.10 wt. % zirconium and the balance adding up to 100 wt. % being constituted by aluminum and impurities potentially originating from the production of the elements.

It is particularly preferred if the aluminum base alloy of the layer 3 directly connected to the iron-based support layer 2 and the further aluminum base alloy of the further layer 4 with respect to the elements copper, manganese, cobalt, chromium, titanium and zirconium comprise the same relative quantitative proportions in terms of the respective share of aluminum, meaning that the relation between the quantitative proportions of these elements in terms of the share of aluminum are equal in both aluminum alloys.

According to a further embodiment variant of the multi-layer sliding bearing element 1, it can be provided for that the ratio of the quantitative proportions of titanium to cobalt in the layer 3 directly connected to the support layer 2 and/or in the further layer 4 connected to the layer 3 amounts to between 1:3 and 3:1.

It can also be provided for that in the aluminum base alloy of the layer 3 directly connected to the iron-based support layer 2 and in the further aluminum base alloy of the further layer 4 respectively, intermetallic precipitates are present, wherein a medium size of the intermetallic precipitates in the aluminum base alloy of the layer 3 directly connected to the iron-based support layer 2 is smaller than a medium size of the intermetallic precipitates in the further aluminum base alloy of the further layer 4.

In this regard, the medium size is determined as the arithmetical mean value from the micrographic image of the respective aluminum base alloy according to the line-intercept method, as is per se known. For this purpose, lines with a defined route are applied over the microscopic image. A marking is made at each point at which the line crosses a grain boundary. The determination of the medium sizes of the intermetallic precipitates can be carried out analogously to DIN EN ISO 643.

It should be noted that all standards cited in the description are to be applied in the version valid at the date of filing of the present patent application.

The intermetallic precipitates are compounds of the elements copper and/or manganese and/or cobalt and/or chromium and/or titanium and/or zirconium with aluminum respectively and/or of the elements with one another. For example, these are the intermetallic compounds $Al_2Cu$, $Al_6Mn$ (Fe, Cr, Co).

The medium size of 90% of the intermetallic precipitates in the layer 3 directly connected to the support layer 2 can preferably amount to between 1 µm and 5 µm.

The medium size of 90% of the intermetallic precipitates in the further layer 4 directly connected to the layer 3 can preferably amount to between 0.1 µm and 4 µm.

The multi-layer sliding bearing element 1 can be produced by means of common methods known from the prior art. For example, the layer 2 can be roll-clad with the support layer 2. It is also possible that the layer 3 is cast onto the support layer 2. The further layer 4 can be roll-clad with the composite material of the support layer 2 and the layer 3. Likewise, the further layer 4 can be cast onto the layer 3. Besides this, it is also possible that in a first step, a composite material is produced from the layer 3 and the further layer 4, for example by means of roll cladding, and that subsequently, this composite material is connected to the support layer 2, for example by means of roll cladding.

The concentration gradient for silicon addressed above can be established via the cooling conditions of the aluminum base alloy, the casting process per se, by means of a molding method, etc.

The formation of the sizes of the intermetallic compounds mentioned above can be achieved by rapid cooling of the aluminum base alloy. It is per se known to the person skilled in the art that by more rapid cooling, a fine-grained structure can be achieved, such that statements on the cooling conditions can thus be dispensed with.

It is further possible that the share of the intermetallic precipitates in the layer 3 is limited to a maximum of 5 vol %, in particular of between 1 vol % and 2 vol %, and/or the share of the intermetallic precipitates in the layer 4 is limited to a maximum of 2 vol %, in particular to between 0.5 vol % and 2 vol %.

In the scope of the invention, besides the two-layer or three-layer designs of the multi-layer sliding bearing element 1, it is also possible that a running-in layer, for example a pure tin layer or a sliding lacquer layer, is applied onto the layer 3 (in the two-layered embodiment variant) or onto the further layer 4 (in the three-layered embodiment variant).

In the course of evaluating the multi-layer sliding bearing element 1, the following sample multi-layer sliding bearing elements were produced. The alternate bending strength, the tendency towards fretting in the dynamic loading condition and the wear were determined for these.

Parameters for the alternate bending strength: 25 Hz, ambient temperature, flat bending samples (90 mm×17.5 mm×1.82 mm (thereof steel 1.4 mm), central taper L=28 2 mm, R=37.5 mm), max. bending moment 15 Nm, max. bending angle 12.

Parameters for the tendency towards fretting: test bearing with 80.5 mm outer diameter; rotational frequency 3000 min-1, oil SAE 10W Shell Rimula, oil inlet with 120° C.; counterpart steel shaft, increasing load is overlaid with a dynamic loading with 50 Hz.

Parameters for the wear: test bearing with 80.5 mm outer diameter; rotational frequency 3000 min-1, oil SAE 10W Shell Rimula, oil inlet with 110° C.; counterpart steel shaft, 50 Hz dynamic compression-pulsating loading, max. amplitude 75 and/or 100 MPa, testing duration 15 h. The wear is evaluated in µm.

A support layer 2 of steel (HB30=177–182) was used respectively.

In the two-layered embodiment variant, the following aluminum base alloys listed in Table 1 were used for the layer 3. The indications of numbers are to be understood in wt. % respectively. The balance adding up to 100 wt. % is respectively constituted by aluminum.

The test samples were produces by means of roll cladding of the layer 3 onto the support layer 2.

TABLE 1

Compositions of aluminum base alloys

| No. | Sn | Cu | Mn | Co | Cr | Ti | Zr | Si |
|---|---|---|---|---|---|---|---|---|
| 1 | 5 | 1.1 | 0.4 | 0.05 | 0.05 | 0.03 | 0.05 | 0.2 |
| 2 | 6 | 1.3 | 0.6 | 0.1 | 0.1 | 0.07 | 0.15 | 0.3 |
| 3 | 7 | 1.5 | 0.8 | 0.15 | 0.15 | 0.1 | 0.15 | 0.4 |

It became apparent that the thus produced multi-layer sliding bearing elements 1 yielded results in terms of wear and tendency towards fretting that are comparable to those of multilayer sliding bearing element according to the prior art. However, better results were achieved in view of the alternate bending strength.

Test samples were also produced of the three-layered embodiment variant of the multi-layer sliding bearing element. A support layer 2 of steel was used again.

For producing the test samples, first, a bimetallic strip was produced from the layer 3 and the layer 4. This bimetallic strip was then roll-clad onto a steel support layer and the compound was heat-treated at 350° C.

Table 2 shows exemplary embodiments for aluminum base alloys of the layer 4 and Table 3 shows exemplary embodiments for aluminum base alloys of the layer 3. An aluminum base alloy referred to as X A in Table 2 was applied as layer 4 onto each aluminum base alloy of the layer 3 referred to as X B in Table 3, such that for example the aluminum base alloy 4 B belongs to the exemplary embodiment 4 as layer 3 and the aluminum base alloy 4 A as layer 4.

TABLE 2

Compositions of aluminum base alloys of the layer 4

| No. | Sn | Cu  | Mn  | Co   | Cr   | Ti   | Zr   |
|-----|----|-----|-----|------|------|------|------|
| 4 A | 6  | 1.3 | 0.6 | 0.1  | 0.1  | 0.07 | 0.1  |
| 5 A | 5  | 1.1 | 0.4 | 0.05 | 0.05 | 0.03 | 0.05 |
| 6 A | 7  | 1.5 | 0.8 | 0.15 | 0.15 | 0.10 | 0.15 |

TABLE 3

Compositions of aluminum base alloys of the layer 3

| No. | Cu  | Mn  | Co   | Cr   | Ti   | Zr   | Si  |
|-----|-----|-----|------|------|------|------|-----|
| 4 B | 1.7 | 0.8 | 0.13 | 0.07 | 0.07 | 0.13 | 0.3 |
| 5 B | 1.5 | 0.6 | 0.08 | 0.08 | 0.03 | 0.08 | 0.2 |
| 6 B | 1.9 | ˆ1.0| 0.18 | 0.18 | 0.1  | 0.18 | 0.4 |

Representing these embodiment variants of the multi-layer sliding bearing element 1, below, the results of the alternate bending strength, the tendency towards fretting in the dynamic loading condition and of the wear for the combination steel—4B—4A (hereinafter AB 4) are shown. Moreover, the following reference samples were produced and the corresponding examinations were carried out.

Composition reference sample 10 (VM 10): steel—AlZn—AlSn25

Composition reference sample 11 (VM 11): steel—Al—AlSn6Si

Composition reference sample 12 (VM 12): steel—Al—AlSn20Si

The results for the alternate bending strengths are represented in FIG. 2, the number of load cycles being shown on the abscissa and the bending stresses in MPa being shown on the ordinate. These mean:

reference number 5: exemplary embodiment 4, transversely to the direction of rolling reference number 6: exemplary embodiment 4, longitudinally to the direction of rolling reference number 7: reference sample 11, transversely to the direction of rolling reference number 8: reference samples 11, longitudinally to the direction of rolling reference number 9: reference sample 12, transversely to the direction of rolling reference number 10: reference samples 12, longitudinally to the direction of rolling reference number 11: reference samples 10, longitudinally to the direction of rolling Results for the tendency towards fretting in the dynamic loading condition [MPa]

| AB 4 | VM 10 | VM 11 | VM 12 |
|------|-------|-------|-------|
| 144  | 147   | 157   | 137   |

Results for wear [μm]:

| AB 4 | VM 10 | VM 11 | VM 12 |
|------|-------|-------|-------|
| 1.2  | 5     | 2.1   | 2.8   |

The exemplary embodiments show and/or describe possible embodiment variants; however, it should be noted at this point that diverse combinations of the individual embodiment variants are also possible, in particular in view of the compositions of the layer 3 and the layer 4, which are used together in a multi-layer sliding bearing element 1.

Finally, as a matter of form, it should be noted that for ease of understanding of the structure of the multi-layer sliding bearing element 1, it is not obligatorily depicted to scale.

LIST OF REFERENCE NUMBERS 1 multi-layer sliding bearing element
2 support layer
3 layer
4 layer
5 exemplary embodiment 4
6 exemplary embodiment 4
7 reference sample 11
8 reference sample 11
9 reference sample 12
10 reference sample 12
11 reference sample 10

The invention claimed is:

1. A multi-layer sliding bearing element comprising a support layer and a layer arranged thereon, said layer comprising an aluminum base alloy with aluminum as the main component,
    wherein the aluminum base alloy comprises between 1.5 wt. % and 1.9 wt. % copper, between 0.6 wt. % and 1.0 wt. % manganese, between 0.08 wt. % and 0.18 wt. % cobalt, between 0.08 wt. % and 0.18 wt. % chromium, between 0.03 wt. % and 0.10 wt. % titanium, between 0.08 wt. % and 0.18 wt. % zirconium and between 0.2 wt. % and 0.4 wt. % silicon and the balance adding up to 100 wt. % being constituted by aluminum and impurities potentially originating from the production of the elements,
    wherein the support layer comprises an iron-based alloy,
    wherein the aluminum base alloy of the layer is connected directly to the iron-based support layer,
    wherein a further layer of a further aluminum base alloy is connected to the layer of the aluminum base alloy,
    wherein the further aluminum base alloy is silicon-free, and
    wherein the aluminum base alloy of the layer directly connected to the iron-based support layer and the further aluminum base alloy of the further layer with respect to the elements copper, manganese, cobalt, chromium, titanium and zirconium comprise the same relative quantitative proportions in terms of the respective share of aluminum.

2. The multi-layer sliding bearing element according to claim 1, wherein for the silicon within the layer of the aluminum base alloy, a concentration gradient with an increasing share of silicon in the direction onto the support layer is formed.

3. The multi-layer sliding bearing element according to claim 1, wherein the further aluminum base alloy of the further layer comprises between 5.0 wt. % and 7.0 wt. % tin, between 1.1 wt. % and 1.5 wt. % copper, between 0.4 wt. % and 0.8 wt. % manganese, between 0.08 wt. % and 0.15 wt. % cobalt, between 0.05 wt. % and 0.15 wt. % chromium, between 0.03 wt. % and 0.1 wt. % titanium, between 0.05 wt. % and 0.15 wt. % zirconium and the balance adding up to 100 wt. % being constituted by aluminum and impurities potentially originating from the production of the elements.

4. The multi-layer sliding bearing element according to claim 1, wherein the ratio of the quantitative proportions of titanium and cobalt amounts to between 1:3 and 3:1.

5. A multi-layer sliding bearing element comprising
a support layer; and
a layer arranged thereon, said layer comprising an aluminum base alloy with aluminum as the main component, wherein the aluminum base alloy containG comprises:
between 1.5 wt. % and 1.9 wt. % copper,
between 0.6 wt. % and 1.0 wt. % manganese,
between 0.08 wt. % and 0.18 wt. % cobalt,
between 0.08 wt. % and 0.18 wt. % chromium,
between 0.08 wt. % and 0.18 wt. % zirconium,
in sum between 0.03 wt. % and 0.1 wt. % titanium, and
at least one of scandium and additional zirconium, wherein the amount of at least one of scandium and additional zirconium is in sum between 0.015 wt. % and 0.05 wt. %, and
between 0.2 wt. % and 0.4 wt. % silicon, and
the balance adding up to 100 wt. % being constituted by aluminum and impurities potentially originating from the production of the elements,
wherein the support layer comprises an iron-based alloy, and
wherein the aluminum base alloy of the layer is connected directly to the iron-based support layer,
wherein a further layer of a further aluminum base alloy is connected to the layer of the aluminum base alloy,
wherein the further aluminum base alloy is silicon-free, and
wherein the aluminum base alloy of the layer directly connected to the iron-based support layer and the further aluminum base alloy of the further layer with respect to the elements copper, manganese, cobalt, chromium, titanium and zirconium comprise the same relative quantitative proportions in terms of the respective share of aluminum.

6. A multi-layer sliding bearing element comprising:
a support layer; and
a layer arranged thereon, said layer comprising an aluminum base alloy with aluminum as the main component, wherein the aluminum base alloy comprises:
between 1.5 wt. % and 1.9 wt. % copper,
between 0.6 wt. % and 1.0 wt. % manganese,
between 0.08 wt. % and 0.18 wt. % cobalt,
between 0.08 wt. % and 0.18 wt. % chromium,
wherein at least one of manganese, cobalt, and chromium is partially replaced by at least one of vanadium, molybdenum, and iron wherein the amount of vanadium, molybdenum, and iron is at most half the amount of the replaced element manganese, cobalt, and chromium,
between 0.03 wt. % and 0.10 wt. % titanium,
between 0.08 wt. % and 0.18 wt. % zirconium, and
between 0.2 wt. % and 0.4 wt. % silicon, and
the balance adding up to 100 wt. % being constituted by aluminum and impurities potentially originating from the production of the elements,
wherein the support layer comprises an iron-based alloy,
wherein the aluminum base alloy of the layer is connected directly to the iron-based support layer,
wherein a further layer of a further aluminum base alloy is connected to the layer of the aluminum base alloy,
wherein the further aluminum base alloy is silicon-free, and
wherein the aluminum base alloy of the layer directly connected to the iron-based support layer and the further aluminum base alloy of the further layer with respect to the elements copper, manganese, cobalt, chromium, titanium and zirconium comprise the same relative quantitative proportions in terms of the respective share of aluminum.

7. A multi-layer sliding bearing element comprising a support layer and a layer arranged thereon, said layer comprising an aluminum base alloy with aluminum as the main component,
wherein the aluminum base alloy comprises between 1.5 wt. % and 1.9 wt. % copper, between 0.6 wt. % and 1.0 wt. % manganese, between 0.08 wt. % and 0.18 wt. % cobalt, between 0.08 wt. % and 0.18 wt. % chromium, between 0.03 wt. % and 0.10 wt. % titanium, between 0.08 wt. % and 0.18 wt. % zirconium and between 0.2 wt. % and 0.4 wt. % silicon and the balance adding up to 100 wt. % being constituted by aluminum and impurities potentially originating from the production of the elements,
wherein the support layer comprises an iron-based alloy, and
wherein the aluminum base alloy of the layer is connected directly to the iron-based support layer, and
wherein a further layer of a further aluminum base alloy is connected to the layer of the aluminum base alloy,
wherein the further aluminum base alloy is silicon-free,
wherein in the aluminum base alloy of the layer directly connected to the iron-based support layer and in the further aluminum base alloy of the further layer respectively, intermetallic precipitates are present, and
wherein a medium size of the intermetallic precipitates in the aluminum base alloy of the layer directly connected to the iron-based support layer is smaller than a medium size of the intermetallic precipitates in the further aluminum base alloy of the further layer.

* * * * *

UNITED STATES PATENT AND TRADEMARK OFFICE
CERTIFICATE OF CORRECTION

PATENT NO. : 11,137,027 B2  
APPLICATION NO. : 16/477256  
DATED : October 5, 2021  
INVENTOR(S) : Lukas Haedicke et al.

Page 1 of 1

It is certified that error appears in the above-identified patent and that said Letters Patent is hereby corrected as shown below:

In the Claims

In Claim 5, Line 5 (Column 11, Line 8): after "alloy" delete "containG"

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*